(12) United States Patent
Takamatsu et al.

(10) Patent No.: US 8,379,132 B2
(45) Date of Patent: Feb. 19, 2013

(54) IMAGE CAPTURE DEVICE WITH A VIEWFINDER FOR VIEWING A SUBJECT

(75) Inventors: Suguru Takamatsu, Osaka (JP); Satoko Horio, Osaka (JP); Akira Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 12/409,828

(22) Filed: Mar. 24, 2009

(65) Prior Publication Data

US 2009/0244351 A1   Oct. 1, 2009

(30) Foreign Application Priority Data

Mar. 25, 2008 (JP) ................................ 2008-077321

(51) Int. Cl.
*H04N 5/222* (2006.01)
*H04N 5/225* (2006.01)
(52) U.S. Cl. .............. 348/333.09; 348/333.02; 348/346; 348/375
(58) Field of Classification Search ............... 348/333.09
See application file for complete search history.

(56) References Cited

U.S. PATENT DOCUMENTS

| | | | | |
|---|---|---|---|---|
| 6,141,499 A * | 10/2000 | Ohmori et al. | ................... | 396/63 |
| 6,393,222 B1 * | 5/2002 | Nakagawa et al. | ........... | 396/287 |
| 6,587,140 B2 * | 7/2003 | No | .............................. | 348/207.2 |
| 6,943,839 B1 * | 9/2005 | Matsumoto et al. | ..... | 348/333.01 |
| 7,394,495 B2 * | 7/2008 | Maniwa | .................... | 348/333.11 |
| 7,557,837 B2 * | 7/2009 | Takahashi | .................. | 348/223.1 |
| 2001/0043277 A1 * | 11/2001 | Tanaka et al. | ............ | 348/333.01 |
| 2002/0171747 A1 * | 11/2002 | Niikawa et al. | .......... | 348/333.01 |
| 2004/0125220 A1 * | 7/2004 | Fukuda et al. | ................. | 348/234 |
| 2004/0179131 A1 * | 9/2004 | Honda et al. | ................... | 348/362 |

FOREIGN PATENT DOCUMENTS

JP      2003-125239      4/2003

* cited by examiner

*Primary Examiner* — Ngoc-Yen Vu
(74) *Attorney, Agent, or Firm* — Renner, Otto, Boisselle & Sklar, LLP

(57) ABSTRACT

An image capture device includes a viewfinder for viewing a subject. The viewfinder either forms an integral part of the device or is an external member that is attachable to, and removable from, the device. The device includes: an optical system; a generating section for capturing an image of the subject through the optical system and generating image data; a detecting section for detecting the degree of focusing of the subject's image represented by the image data; a display section on which the subject's image is presentable based on the image data; and a controller for accepting a decision to use either the display section or the viewfinder for viewing the subject to shoot. If the controller accepts the decision to use the viewfinder, the display section displays no subject's image, and displays information about the degree of focusing of the subject's image for at least a certain period of time. The information has been obtained based on a result of detection done by the detecting section.

16 Claims, 6 Drawing Sheets

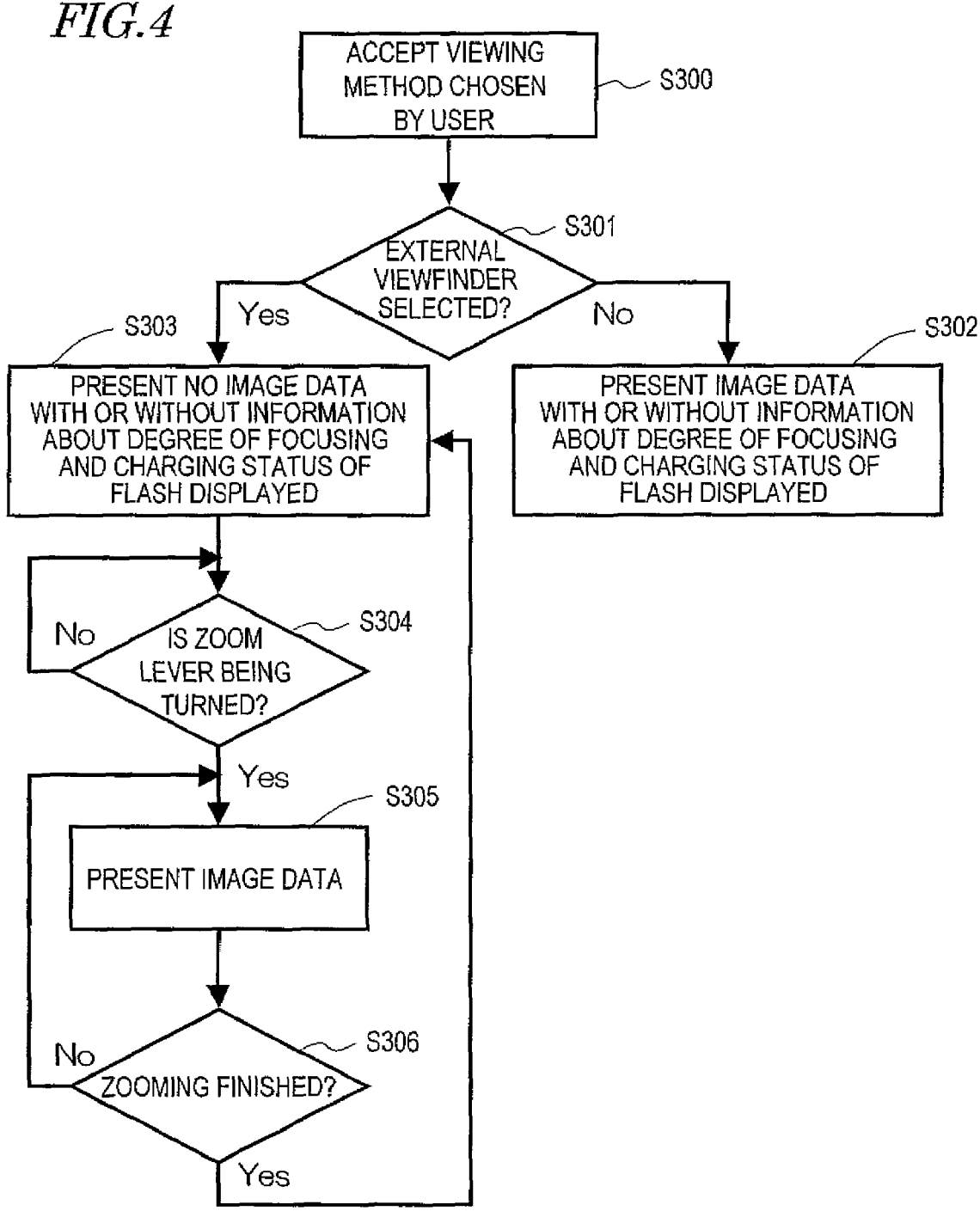

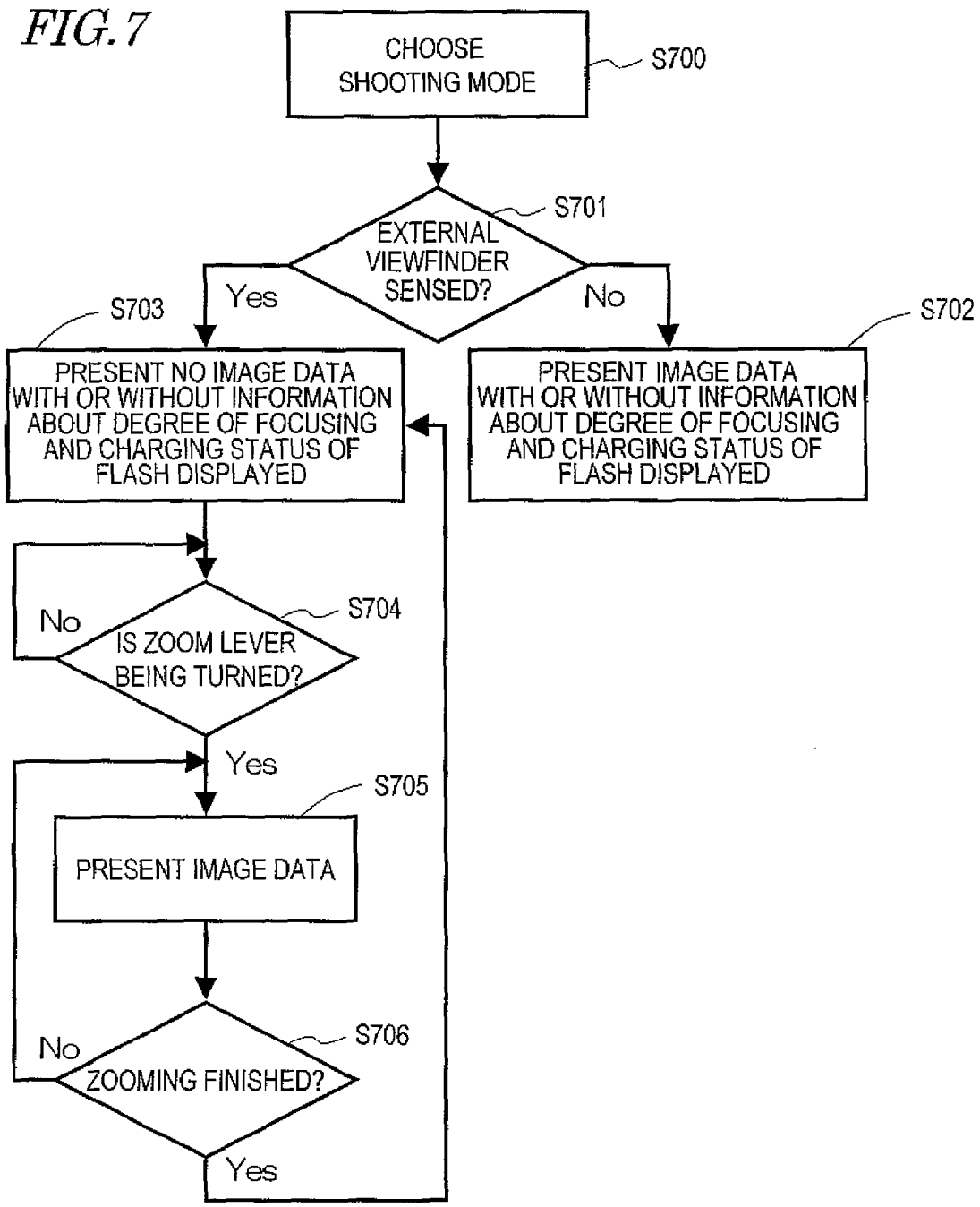

IMAGE CAPTURE DEVICE WITH A VIEWFINDER FOR VIEWING A SUBJECT

BACKGROUND OF THE INVENTION

1. Field of the Invention

The present invention relates to an image capture device such as a digital still camera, a digital camcorder or a cellphone with a camera, and more particularly relates to an image capture device with a viewfinder for viewing a subject, the viewfinder either forming an integral part of the device or being an external member that is attachable to, and removable from, the device.

2. Description of the Related Art

Japanese Patent Application Laid-Open Publication No. 2003-125239 discloses a digital camera with an optical viewfinder and an LCD monitor. With such a digital camera, the user can capture a subject's image by viewing the subject either through the optical viewfinder or on the LCD monitor. If he or she selects the optical viewfinder, this digital camera turns off the LCD monitor, thereby cutting down the power dissipation.

However, if the LCD monitor is turned off as is done by such a digital camera, then not only the function of viewing the subject but also other functions become not available. For example, in such a situation, the LCD monitor cannot be used as a means for conveying information about various statuses of the digital camera to the user. For that reason, the conventional digital camera disclosed in Japanese Patent Application Laid-Open Publication No. 2003-125239 is provided with a dedicated LED as a means for conveying those pieces of information about the digital camera.

It is therefore an object of the present invention to get those pieces of information about various statuses of an image capture device displayed by an essential component of an image capture device, not a dedicated extra member, thereby cutting down the power dissipation of the image capture device.

SUMMARY OF THE INVENTION

An image capture device according to the present invention includes a viewfinder for viewing a subject. The viewfinder either forms an integral part of the device or is an external member that is attachable to, and removable from, the device. The device includes: an optical system; a generating section for capturing an image of the subject through the optical system and generating image data; a detecting section for detecting the degree of focusing of the subject's image represented by the image data; a display section on which the subject's image is presentable based on the image data; and a controller for accepting a decision to use either the display section or the viewfinder for viewing the subject to shoot. If the controller accepts the decision to use the viewfinder, the display section displays no subject's image, and displays information about the degree of focusing of the subject's image for at least a certain period of time. The information has been obtained based on a result of detection done by the detecting section.

In one preferred embodiment of the present invention, if the controller accepts the decision to use the display section, the display section not only presents the subject's image based on the image data but also displays, for at least a certain period of time, information about the degree of focusing of the subject's image that has been obtained based on the result of detection done by the detecting section.

In another preferred embodiment, the image capture device further includes: a light-emitting section for emitting a flash of light toward the subject; and a charging status detecting section for detecting the charging status of the light-emitting section. If the controller accepts the decision to use the viewfinder, the display section further displays information about the charging status based on the result of detection done by the charging status detecting section.

In still another preferred embodiment, if the optical system includes a zoom lens for zooming in on, or out of, the subject, the device further includes: an operating section for accepting a zoom command that the subject be zoomed in on or out of; and a drive section for driving the zoom lens in response to the zoom command. If the controller accepts the decision to use the viewfinder and if the operating section accepts the zoom command, then the display section presents the subject's image for at least a certain period of time based on the image data.

In this particular preferred embodiment, the display section presents the subject's image based on the image data while the operating section is accepting the zoom command and for a predetermined amount of time after the zoom command has been accepted.

In another preferred embodiment, the display section presents the subject's image based on the image data before the zoom lens is driven and after the zoom lens has been driven.

In an alternative preferred embodiment, the display section presents the subject's image based on the image data unless the zoom lens is at wide end.

In yet another preferred embodiment, the image capture device further includes an operating section for receiving a user's command to use either the display section or the viewfinder.

In this particular preferred embodiment, if the controller accepts the decision to use the display section in accordance with the user's command that has been relayed by way of the operating section, the display section not only presents the subject's image based on the image data but also displays information about the degree of focusing of the subject's image that has been obtained based on the result of detection done by the detecting section.

In another preferred embodiment, the image capture device further includes: a light-emitting section for emitting a flash of light toward the subject; and a charging status detecting section for detecting the charging status of the light-emitting section. If the controller accepts the user's decision to use the viewfinder in accordance with his or her command that has been relayed by way of the operating section, the display section further displays information about the charging status based on the result of detection done by the charging status detecting section.

In yet another preferred embodiment, if the optical system includes a zoom lens for zooming in on, or out of, the subject, the operating section further accepts a zoom command that the subject be zoomed in on or out of. The device further includes a drive section for driving the zoom lens in response to the zoom command. And if the controller accepts the user's decision to use the viewfinder and if the operating section accepts the zoom command, then the display section presents the subject's image based on the image data.

In yet another preferred embodiment, if the viewfinder is an external member that is attachable to, and removable from, the device, the image capture device further includes: a holder section to hold the viewfinder attached; and a viewfinder sensing section for determining whether or not the viewfinder has been attached to the device. If the viewfinder sensing section has sensed the viewfinder be attached to the device, the controller accepts the decision to use the viewfinder.

In yet another preferred embodiment, the viewfinder includes a sensor for determining whether or not a user is now viewing the subject through the viewfinder. If the sensor has sensed the user viewing the subject through the viewfinder, the controller accepts the decision to use the viewfinder.

In yet another preferred embodiment, the display section continues to display the information about the degree of focusing of the subject's image for at least the certain period of time since the subject has been sensed to come into focus.

In yet another preferred embodiment, the display section continues to display the information about the degree of focusing of the subject's image for at least the certain period of time since the device has started focusing onto the subject.

According to the present invention, even while the image capture device is switched into a mode in which no subject's image is presented on the display section thereof, information about various statuses of the image capture device is still displayed on the display section. As a result, those pieces of information about various statuses of the image capture device can be displayed even without providing any dedicated member such as an LED for conveying them. In addition, according to the present invention, the power dissipation of the image capture device can be cut down compared to conventional devices.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4 is a flowchart showing how the images and/or information on the monitor screen are changed as a shooting operation is performed with the digital camera 200.

FIG. 7 is a flowchart showing how the images and/or information on the monitor screen are changed as a shooting operation is performed with the digital camera 300.

DETAILED DESCRIPTION OF PREFERRED EMBODIMENTS

Hereinafter, preferred embodiments of an image capture device according to the present invention will be described with reference to the accompanying drawings.

Embodiment 1

A digital still camera (which will be simply referred to herein as a "digital camera") will be described as a first specific preferred embodiment of an image capture device according to the present invention.

1-1. General Appearance

First of all, the general appearance of a digital camera as a first preferred embodiment of the present invention will be described with reference to FIG. 1.

Figure 1:
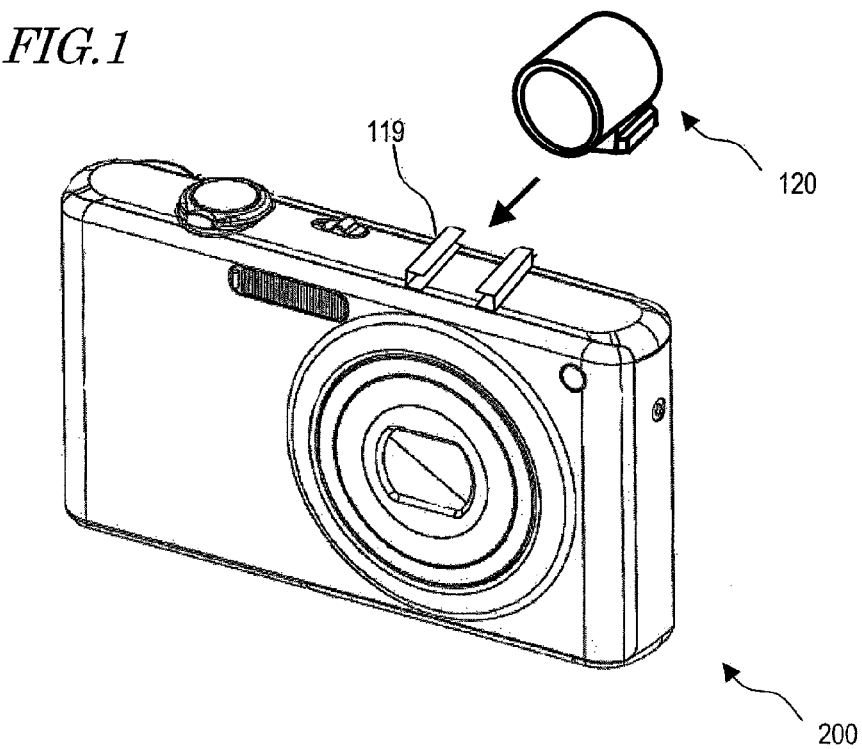
FIG. 1 is a perspective view illustrating a digital camera 200 as a first preferred embodiment of the present invention.

FIG. 1 is a perspective view illustrating a digital camera 200 as a first preferred embodiment.

The digital camera 200 has a hot shoe 119 on the upper surface thereof. The hot shoe 119 can hold an accessory such as an external flash. The user can get an accessory such as an optical viewfinder 120 held on the digital camera 200 by sliding and fitting it into the hot shoe 119. The hot shoe 119 may be made of either a resin or a metal, for example. Meanwhile, the optical viewfinder 120 is a window, through which the user can view his or her subject via either a single lens or multiple lenses. And by looking through the optical viewfinder 120, he or she can compose or focus the subject to capture. This digital camera 200 allows the user to view his or her subject either through the optical viewfinder 120 or on the LCD monitor of the digital camera 200 while he or she is performing a shooting session.

1-2. Electrical Configuration

Next, the electrical configuration of the digital camera 200 as the first preferred embodiment will be described with reference to FIG. 2.

Figure 2:
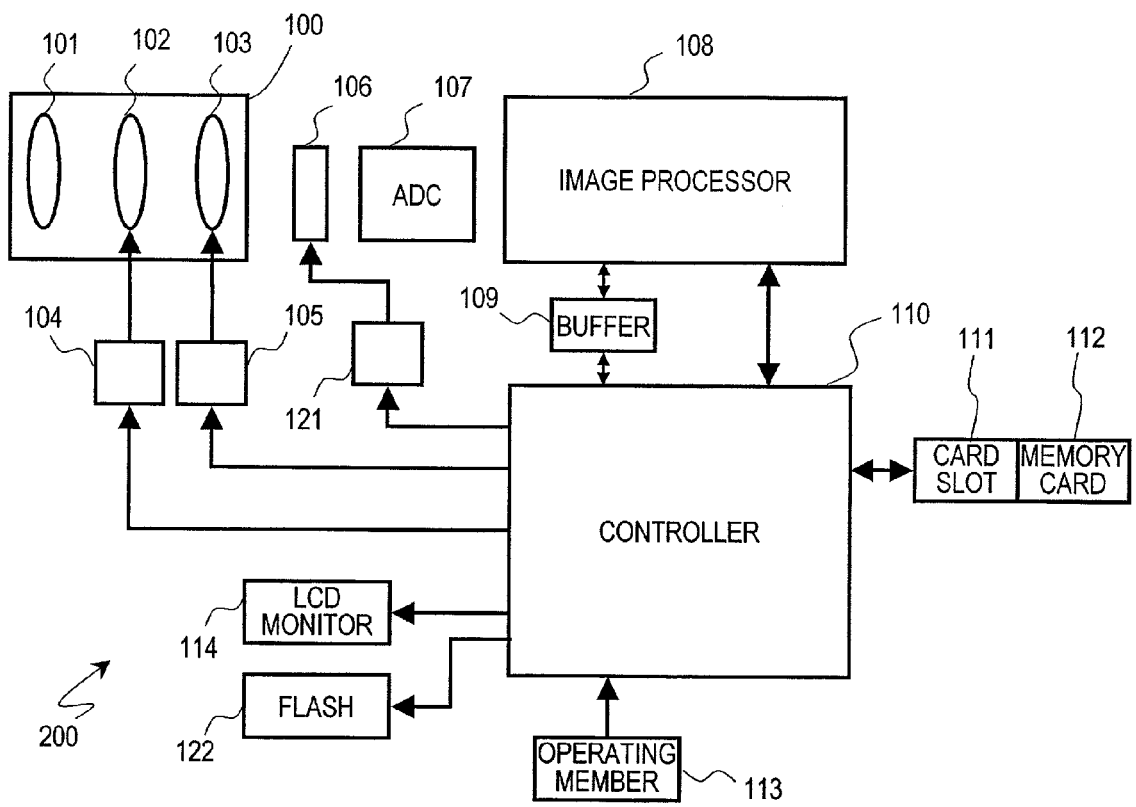
FIG. 2 is a block diagram illustrating an electrical configuration for the digital camera 200 of the first preferred embodiment.

FIG. 2 is a block diagram illustrating an electrical configuration for the digital camera 200 of this preferred embodiment. The digital camera 200 gets a subject's image, which has been produced by an optical system 100, captured by a CCD image sensor 106, thereby generating image data. Then, the image data is subjected to various kinds of processing at an image processing section 108 and then stored in a memory card 112. The image data stored in the memory card 112 can be displayed on an LCD monitor 114. Hereinafter, the configuration of the digital camera 200 will be described in further detail.

As shown in FIG. 2, the optical system 100 includes an objective lens 101, a zoom lens 102 and a focus lens 103. The objective lens 101 is arranged closer to the subject than any other lens in the optical system 100. The zoom lens 102 can be moved along the optical axis of the optical system 100 to zoom in on, or out of, the subject. And the focus lens 103 can also be moved along the optical axis of the optical system 100 to adjust its focus on the subject.

In this preferred embodiment, the optical system 100 is supposed to be made up of the objective lens 100, the focus lens 103 and the zoom lens 102. However, the optical system 100 does not always have to have such a configuration. Rather, the optical system 100 may have any other combination of optical elements as long as it includes at least a focus lens that can be driven to find a focus on the subject. Furthermore, the optical system 100 may or may not include the zoom lens for use to zoom in on, or out of, the subject besides the focus lens. Optionally, the optical system 100 may further include an optical image stabilizer (OIS) lens.

The digital camera 200 further includes a zoom motor 104, which drives some lens in the optical system (e.g., the zoom lens 102) along the optical axis of the optical system 100. If necessary, the zoom motor 104 may drive the zoom lens 102 via a cam mechanism, a ball screw, or any other appropriate mechanism. The zoom motor 104 may be implemented as a pulse motor, a DC motor, a linear motor or a servo motor, for example.

The digital camera 200 may further include a focus motor 105, which also drives some lens in the optical system (e.g., the focus lens 103) along the optical axis of the optical system 100. If necessary, the focus motor 105 may drive the focus lens 103 via a cam mechanism, a ball screw, or any other appropriate mechanism. The focus motor 105 may be implemented as a pulse motor, a DC motor, a linear motor or a servo motor, for example. Or the zoom lens 102 and the focus lens 103 may be both driven by only the zoom motor 104 with the focus motor 105 omitted. In that case, the zoom motor 104 will drive every lens included in the optical system of this preferred embodiment.

The CCD image sensor 106 captures the subject's image, which has been produced (or formed) by the optical system 100, thereby generating image data as described above. To drive the CCD image sensor 106, a timing generator 121 generates a timing signal. That is to say, in response to the timing signal supplied from the timing generator 121, the CCD image sensor 106 performs various operations including exposure, transfer, and electronic shuttering. Then, an A/D converter 107 converts the image data that has been generated by the CCD image sensor 106 into a digital signal.

Next, the image processing section 108 processes the image data that has been converted into digital one by the A/D converter 107, thereby generating image data to be stored in the memory card 112 and/or image data to be presented on the LCD monitor 114. The image processing section 108 may be implemented as a DSP or a microcomputer, for example.

More specifically, the image processing section 108 generates the image data to be stored in the memory card 112 by compressing the incoming image data, for example. Also, the image processing section 108 subjects the image data that has been converted into the digital one by the A/D converter 107 to electronic zoom-out processing, for example, thereby generating image data to be presented continuously on the LCD monitor 114 (i.e., so-called "through-the-lens image"). Furthermore, the image processing section 108 also subjects the image data stored in the memory card 112 to such electronic zoom-out processing. Then, the processed image data will be presented on the LCD monitor 114, too.

The digital camera 200 further includes a controller 110, which is a key component that controls the overall operation of the digital camera 200. The controller 110 may be implemented as a semiconductor device or a microcomputer. The controller 110 may carry out a control operation in the following manner, for example. Specifically, the controller 110 detects the degree of focusing of an image represented by the image data that has been generated by the CCD image sensor 106 (which will also be referred to herein as "subject's image"). Also, the controller 110 senses the charging status of a flash 122. As methods for detecting the degree of focusing, a contrast detection method and a phase difference detection method are known. Methods for charging the flash 122 are also well known in the art. All of those techniques are so obvious to those skilled in the art that the description thereof will be omitted herein.

Obeying the user's decision, the controller 110 determines whether the LCD monitor 114 or the optical viewfinder 120 should be used. More specifically, in accordance with his or her decision, the controller 110 determines whether or not the image data that has been generated by the CCD image sensor 106 should be presented on the LCD monitor 114. This processing will be described in further detail later.

It should be noted that the controller 110 could be implemented by only hardware component(s) or a combination of hardware components and a software program.

The digital camera 200 further includes a buffer memory 109, which functions as a work memory between the image processing section 108 and the controller 110. The buffer memory 109 may be implemented as a DRAM, a ferroelectric memory, or any other suitable storage device.

A card slot 111 is provided for the digital camera 200 to allow the user to insert or remove the memory card 112 into/from it. The card slot 111 can be connected both mechanically and electrically to the memory card 112. The memory card 112 has a built-in flash memory or ferroelectric memory and can store data therein.

The LCD monitor 114 can display at least the subject's image and information about the degree of focusing that has been detected. As used herein, the "image data generated" refers to not only the image represented by the image data that has been generated by the CCD image sensor 106 but also the image data that has been read out from the memory card 112. In addition, information about various settings of the digital camera 200 and information about the status of the digital camera 200 can also be displayed on the LCD monitor 114. For instance, the LCD monitor 114 may indicate the degree of focusing of the subject's image and may display information about the charging status of the flash 122.

The digital camera 113 further includes an operating member 113, which is a generic term that refers to any of various operating means including buttons, switches, levers and dials. Furthermore, if the LCD monitor 114 (to be described in detail later) is a touch-screen panel, the LCD monitor 114 also forms part of the operating member 113. The operating member 113 accepts the user's command and relays the command to the controller 110.

The flash 122 emits a flash of light toward the subject by setting off electrical charge stored. For example, by releasing the electrical charge stored, the flash 122 makes the enclosed xenon gas produce light.

1-3. Rear Configuration

Figure 3:
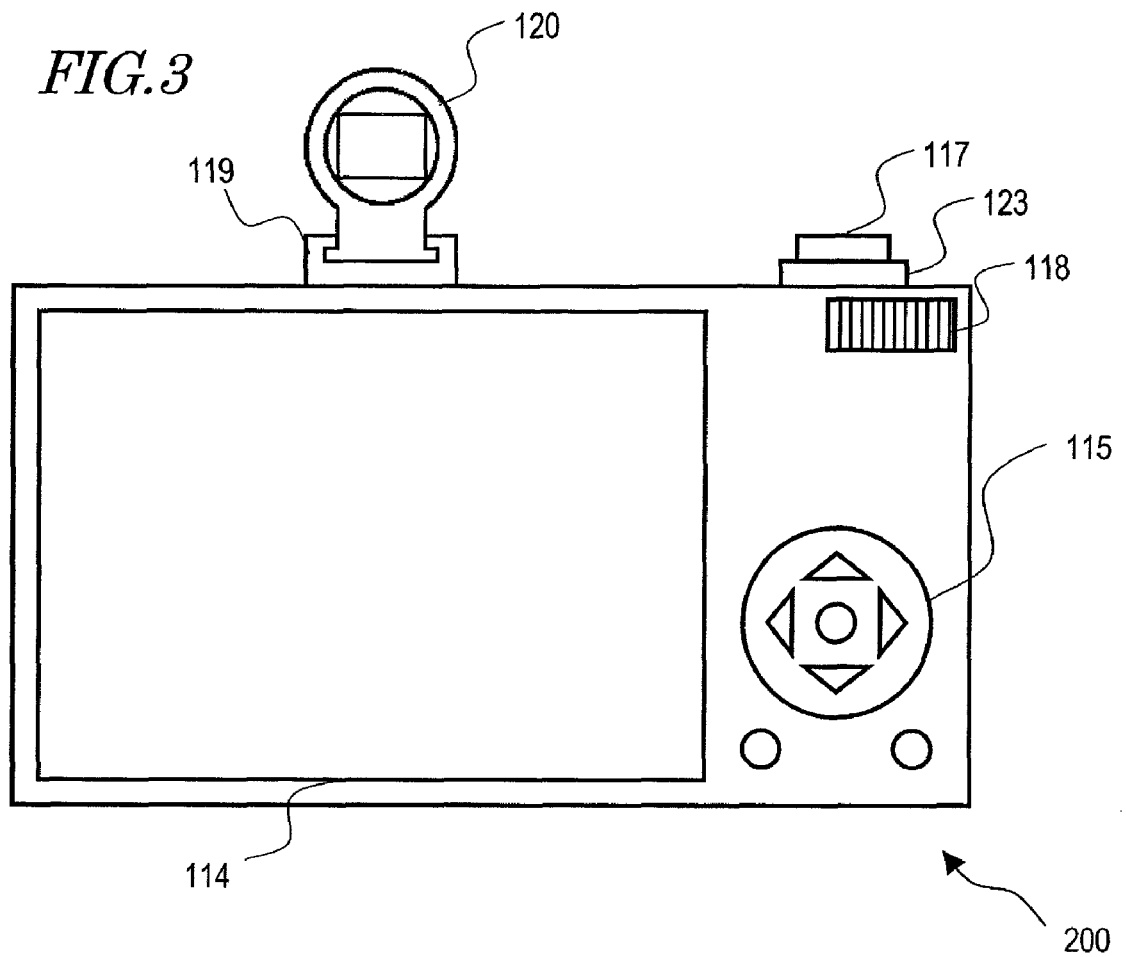
FIG. 3 is a rear view of the digital camera 200.

Next, the rear configuration of the digital camera of the first preferred embodiment will be described with reference to FIG. 3, which is a rear view of the digital camera 200. As shown in FIG. 3, the digital camera 200 includes a shutter release button 117 a zoom lever 123, a mode dial 118, and the hot shoe 119 on the upper side.

The shutter release button 117 accepts a button press operation, which includes a half press and a full press. When the shutter release button 117 has been pressed halfway, the controller 110 starts an AF control. And when the shutter release button 117 has been pressed fully, the digital camera 200 captures the subject's image.

The zoom lever 123 is arranged so as to turn around the shutter release button 117. As the zoom lever 123 is turned, the controller 110 starts either an optical zoom control or an electronic zoom control. That is to say, the zoom lever 123 accepts the user's command that the subject be zoomed in on or out of by driving the zoom lens. It should be noted that "zoom" is a concept that sometimes means zooming in on the subject and sometimes means zooming out of the subject.

The mode dial 118 also accepts a turn operation. Specifically, the mode dial 118 has scales, to which various modes of operation of the digital camera 200 are assigned. Examples of those modes of operation of the digital camera 200 include a playback mode and a video recording mode. As the mode dial 118 is turned, the controller 110 controls the digital camera 200 in the mode of operation selected by the user with the mode dial 118.

The user slides and fits the optical viewfinder 120 into the hot shoe 119, thereby getting the optical viewfinder 120 held by the hot shoe 119. That is to say, the hot shoe 119 can hold a viewfinder for viewing the subject. Also, by sliding the optical viewfinder 120 now held by the hot shoe 119 in the opposite direction, the user can remove the optical viewfinder 120 from the hot shoe 119. In this preferred embodiment the optical viewfinder is supposed to be held by the hot shoe 119. However, the present invention is in no way limited to that specific preferred embodiment. Any other holding member may be used as long as the member can hold the viewfinder firmly.

The digital camera 200 further includes cross keys 115 and the LCD monitor 114 on the rear side.

According to the mode of operation selected with the mode dial 118, the LCD monitor 114 presents either the image data that is stored in the memory card 112 or a menu dialog box.

The cross keys 115 accept button press operations in five patterns, which include four operations instructed with the four arrow keys and one more operation instructed with the central button. When any of these cross keys 115 is pressed, the controller 110 changes the image data on the LCD monitor 114 (e.g., switches the pictures to present on the monitor 114).

1-4. Flow of Changing What is Displayed on Monitor During Shooting

Next, it will be described with reference to FIGS. 4 and 5 exactly in what procedure images and/or information on the monitor screen need to be changed when a shooting operation is performed with the digital camera 200 of this preferred embodiment.

FIG. 4 is a flowchart showing how the images and/or information on the monitor screen are changed as a shooting operation is performed with the digital camera 200. On the other hand, FIGS. 5A through 5D are schematic representations illustrating the images and/or information displayed on the monitor screen.

Figure 5A:
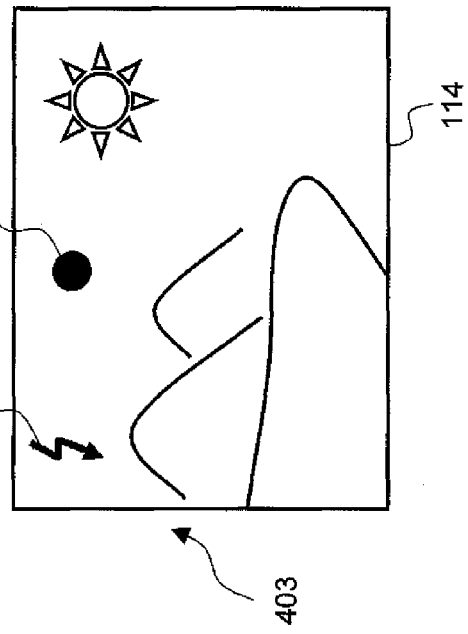
FIGS. 5A through 5D are schematic representations illustrating the images and/or information displayed on the monitor screen.
Figure 5B:
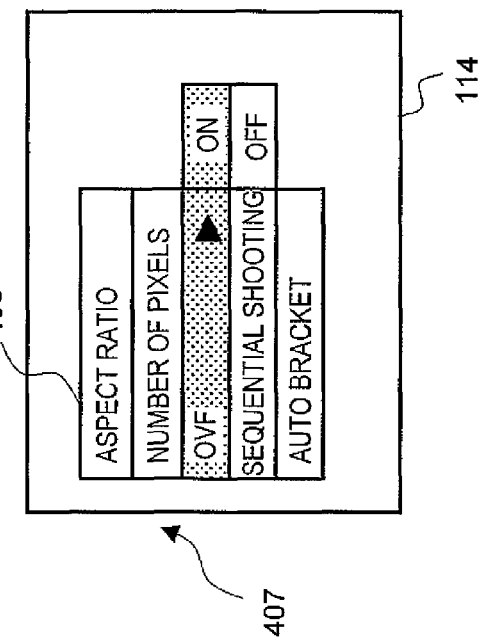
Figure 5C:
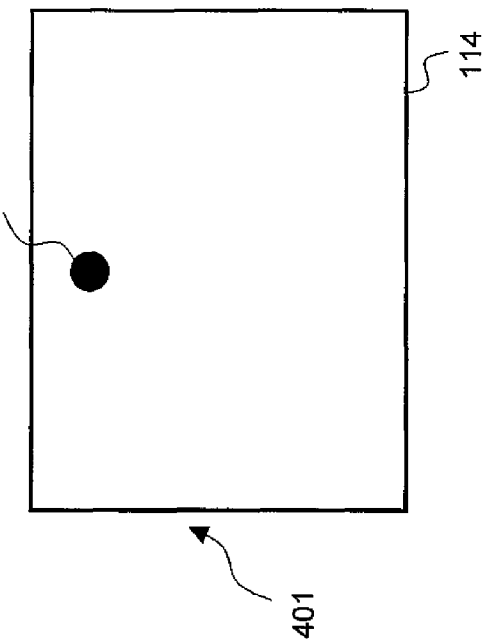
Figure 5D:
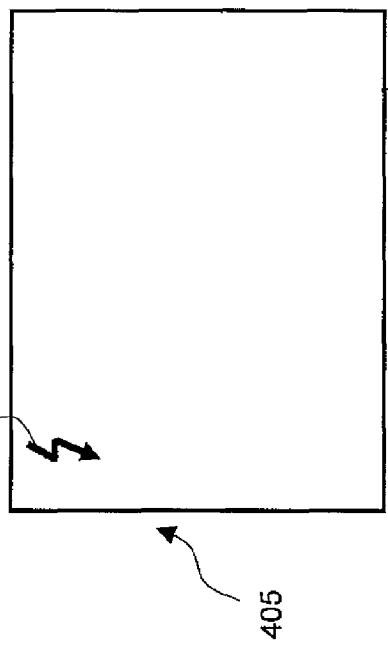

First of all, in Step S300, the digital camera 200 accepts the user's decision on how to view the subject. For example, if the user presses the cross keys 115, a menu dialog box will be displayed on the LCD monitor 114. FIG. 5D illustrates an example of such a menu dialog box 407. If the user taps the cross keys 115 while the menu dialog box 407 is being displayed, he or she can enter modified settings into the digital camera 200. For instance, by interacting with the camera 200 through this menu dialog box 407, the user can decide whether he or she wants to use the optical viewfinder 120 or the LCD monitor 114 to view his or her subject.

Once the preferred method of viewing the subject has been selected by the user, the controller 110 determines, in Step S301, which has been selected, the external optical viewfinder 120 or the LCD 114. Unless the optical viewfinder 120 has been selected, the process advances to Step S302. On the other hand, if the optical viewfinder 120 has been selected, then the process advances to Step S303.

If the controller 110 has determined that the LCD monitor 114 has been selected, then the controller 110 presents the image data generated on the LCD monitor 114 in Step S302. More specifically, the controller 110 presents the image data that has been generated by the CCD image sensor 106 on the LCD monitor 114 sequentially. For example, FIG. 5B illustrates what is displayed on the monitor screen 403 (i.e., the LCD monitor 114) in such a situation. In this case, a so-called "through-the-lens image" is presented on the monitor screen 403.

Also, in the same processing step S302, if the subject has come into focus after the shutter release button 117 has been pressed halfway, information about the degree of focusing of the subject's image captured also continues to be displayed on the LCD monitor 114 for a certain period of time since the subject has come into focus. In FIG. 5B, a focusing status icon 404, which indicates that the subject is now in focus, is displayed.

In this preferred embodiment, the focusing status icon 404 is supposed to be displayed continuously for at least a certain period of time (e.g., two seconds) since the subject has been sensed to come into focus. However, the present invention is in no way limited to this specific preferred embodiment. Alternatively, the controller 110 may get the focusing status icon 404 displayed on the LCD monitor 114 while the shutter release button 117 is still being pressed halfway by the user. In that case, if the subject has not come into focus yet, the focusing status icon 404 may be displayed in red on the LCD monitor 114. But when the subject comes into focus, the focusing status icon 404 may be displayed in green on the LCD monitor 114, for example. It should be noted that the start of pressing the shutter release button halfway means the start of focusing onto the subject. That is why during an interval between a point in time when focusing onto the subject was started and a point in time when the subject comes into focus, a focusing status icon, indicating that the subject has not come into focus yet, is displayed on the LCD monitor 114. And once the subject has come into focus, a focusing status icon, indicating that the subject has finally come into focus, is displayed continuously on the LCD monitor 114 for at least a certain period of time (e.g., two seconds) since the in-focus status has been detected.

Also, even if no subject's image is presented on the LCD monitor 114, various sorts of information about the statuses and settings of the image capture device may always be displayed on the LCD monitor 114.

Furthermore, in the same processing step S302, if the flash 122 has not been charged sufficiently when the user is going to perform a shooting operation using the flash 122, information about the charging status is also displayed on the LCD monitor 114. In FIG. 5C, a charging status icon 405, which indicates that the flash 122 is now being charged, is displayed on the monitor screen 402. The charging status icon 405 is an icon indicating that the flash is not available for shooting now because the flash has not been charged enough yet.

In this preferred embodiment, the charging status icon 405 is supposed to be displayed only when the flash has not been charged enough. However, the present invention is in no way limited to this specific preferred embodiment. Alternatively, the charging status icon 405 may also be displayed in white on the LCD monitor 114 if the flash has been charged sufficiently. But if the flash has not been charged enough, the charging status icon 405 may be displayed in red on the LCD monitor 114, for example.

Now take a look at FIG. 4 again. If the controller 110 has determined that the optical viewfinder 120 has been selected, then the process advances to Step S303. In that case, the controller 110 prevents the LCD monitor 114 from presenting the image data that has been generated by the CCD image sensor 106. That is to say, the image data generated does not appear on the LCD monitor 114.

In this manner, in the digital camera of this preferred embodiment, if the user has decided to view the subject through the optical viewfinder 120, the LCD monitor 114 does not present the image data that has been generated by the CCD image sensor 106. As a result, the digital camera 200 can cut down the power dissipation compared to conventional ones.

Also, in the same processing step S303, when the subject comes into focus after the shutter release button 117 has been pressed halfway, information about the degree of focusing of the subject's image captured is also displayed on the LCD monitor 114. In FIG. 5A, the focusing status icon 404 is displayed on the monitor screen 401. Even so, the image data is not presented on the LCD monitor 114, either.

In this preferred embodiment, the focusing status icon 404 is supposed to be displayed when the subject comes into focus. However, the present invention is in no way limited to this specific preferred embodiment. Alternatively, the controller 110 may also get the focusing status icon 404 displayed on the LCD monitor 114 while the shutter release button 117 is still being pressed halfway by the user. In that case, if the subject has not come into focus yet, the focusing status icon 404 may be displayed in red there. But when the subject comes into focus, the focusing status icon 404 may be displayed in green there, for example.

As described above, in the digital camera 200 of this preferred embodiment, if the user has decided to view the subject through the optical viewfinder 120, the LCD monitor 114 does not present an image represented by the image data being captured but displays only information about the degree of focusing of that image. In such a situation, there is no need to perform data processing or display control processing to generate the subject's image, and therefore, the power dissipation can be cut down. As a result, the digital camera 200 can display the information about the degree of focusing to the user without using any dedicated member for displaying the degree-of-focusing information while cutting down the power dissipation at the same time.

Furthermore, in the same processing step S303, if the flash 122 has not been charged enough after the user has performed a shooting operation using the flash 122, an icon such as the charging status icon 405 may be displayed on the monitor screen 402. That is to say, the LCD monitor 114 may also display additional information about the degree of charging of the flash 122.

In this preferred embodiment, the charging status icon 405 is supposed to be displayed only when the flash has not been charged enough yet. However, the present invention is in no way limited to this specific preferred embodiment. Alternatively, the charging status icon 405 may also be displayed in white on the LCD monitor 114 if the flash has been charged sufficiently. But if the flash has not been charged enough, the charging status icon 405 may be displayed in red on the LCD monitor 114, for example.

As described above, in the digital camera 200 of this preferred embodiment, if the user has decided to view the subject through the optical viewfinder 120, the LCD monitor 114 displays information about the charging status of the flash 122. As a result, the digital camera 200 can display the information about the charging status of the flash 122 to the user without using any dedicated member for displaying the charging status information.

Next, in Step S304, the controller 110 determines whether or not the zoom lever 123 is being turned. At this point in time, the subject's image is not presented on the LCD monitor 114.

If the answer to the query of Step S304 is NO, then the controller 110 instructs the LCD monitor 114 to keep presenting no subject's image.

On the other hand, if the answer to the query of Step S304 is YES, then the controller 110 instructs the LCD monitor 114 to present the subject's image. That is to say, while accepting the zoom command issued by the user, the LCD monitor 114 presents the subject's image.

The digital camera 200 is designed in this manner for the following reason. Specifically, the optical viewfinder 120 does not present the image that has been captured by the digital camera 200. By looking through the optical viewfinder 120, the user can just sense the incoming light falling on the optical viewfinder 120. Consequently, the user always sees the subject's image through the optical viewfinder 120 at the same angle of view. That is to say, if the user has performed a zoom operation while looking through the optical viewfinder 120, he or she cannot confirm the angle of view of the zoomed image.

That is why if the user who chooses to view the subject through the optical viewfinder 120 has performed a zoom operation, the digital camera 200 of this preferred embodiment presents the subject's image on the LCD monitor 114 immediately. Then, even if the user has performed a zoom operation while looking through the viewfinder, he or she can still confirm the current angle of view because the digital camera 200 presents the image being captured on the LCD monitor 114.

Next, in Step S306, the controller 110 determines whether or not the operation of turning the zoom lever 123 has finished yet. At this point in time, the subject's image is presented on the LCD monitor 114.

If the answer to the query of Step S306 is NO, the process goes back to the processing step S305, in which the LCD monitor 114 continues to present the subject's image.

On the other hand, if the answer to the query of Step S306 is YES, then the process goes back to the processing step S303. In that case, for a certain period of time (e.g., one to three seconds) after the operation of turning the zoom lever 123 has finished, the LCD monitor 114 stops presenting the subject's image again.

In the digital camera of the preferred embodiment described above, even if the user has decided to use the optical viewfinder 120 for viewing the subject to shoot, the LCD monitor 114 is supposed to present the subject's image while the zoom command issued by the user is accepted. However, the present invention is in no way limited to that specific preferred embodiment.

If the user has decided to use the optical viewfinder 120 for viewing the subject to shoot, the LCD monitor 114 may present the image represented by the image data generated unless the zoom lens is at the wide end or unless the image is captured at the same angle of view as that of the optical viewfinder 120. In that case, if the angle of view should be confirmed because the image being captured has been zoomed, then the LCD monitor 114 can always present the zoomed image. As a result, it is possible to avoid a situation where the user happens to capture an unwanted image by mistake.

In the zoom operation described above, the zoom power is supposed to change continuously. However, the zoom powers may also be changed stepwise. For example, the focal lengths may be changed step by step in the order of 25 mm, 50 mm and 75 mm. In that case, the LCD monitor 114 needs to present only the image yet to be zoomed and the zoomed image but does not have to present images while the zoom lens is being driven.

Also, in the digital camera of the preferred embodiment described above, if the user chooses to use the optical viewfinder 120 for viewing the subject to shoot, the LCD monitor 114 is supposed to stop presenting the subject's image in a predetermined amount of time after the user has finished the zoom operation. However, the present invention is in no way limited to that specific preferred embodiment. Alternatively, after the user has finished the zoom operation and before the user presses the shutter release button 117 halfway next time, the LCD monitor 114 may continue to present the subject's image. And as soon as the user presses the shutter release button 117 halfway, the LCD monitor 114 may stop presenting the subject's image. This is because the user would be looking through the optical viewfinder 120 when he or she starts to press the button 117 halfway.

Also, even if the LCD monitor 114 is not presenting the subject's image but if the user has tapped the cross keys 115, the LCD monitor 114 displays a menu dialog box. Then, even if the user chooses to use the optical viewfinder 120 for viewing the subject to shoot, he or she can also change various settings of the digital camera through the menu dialog box.

Embodiment 2

Hereinafter, a second specific preferred embodiment of an image capture device according to the present invention will be described.

In the following description of the second preferred embodiment, the present invention will also be described as being applied to a digital camera. Also, in the following description of the second preferred embodiment, any component or operation that is substantially identical with the counterpart of the digital camera of the first preferred embodiment will not be described all over again to avoid redundancies.

Unlike the digital camera of the first preferred embodiment described above, the digital camera of this preferred embodiment is designed such that the controller 110 can sense the optical viewfinder 120 be attached or removed to/from the digital camera. Hereinafter, the configuration and operation of the digital camera of this preferred embodiment will be described.

2-1. Electrical Configuration

Hereinafter, the electrical configuration of the digital camera of this preferred embodiment will be described with reference to FIG. 6.

Figure 6:
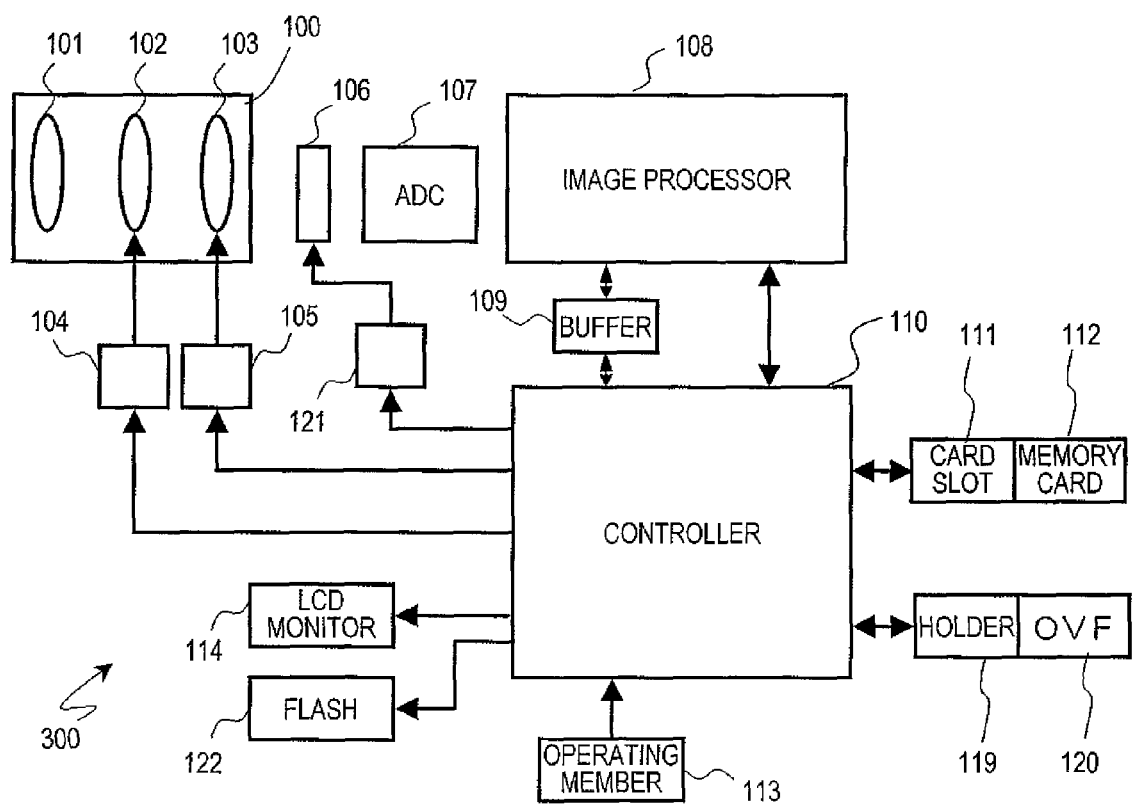
FIG. 6 is a block diagram illustrating an electrical configuration for a digital camera 300 as a second preferred embodiment of the present invention.

FIG. 6 is a block diagram illustrating the electrical configuration of a digital camera 300 as a third preferred embodiment of the present invention. Unlike the digital camera of the first preferred embodiment described above, the hot shoe 119 of the digital camera of this preferred embodiment is electrically connected to the controller 110. Also, the optical viewfinder 120 can be electrically connected to the hot shoe 119. By adopting such a configuration, the controller 110 can sense the optical viewfinder 120 be attached to, or removed from, the hot shoe 119.

In this preferred embodiment, the controller 110 electrically detects the attachment of the optical viewfinder 120. The detection may be done directly by the controller 110 by determining whether or not there is electrical continuity between the optical viewfinder 120 and the controller 110 itself or by sensing a variation in impedance. Alternatively, the detection may also be done in response to a detection signal supplied from a circuit (not shown) that has determined whether there is electrical continuity between them or not or that has sensed any variation in impedance. In this preferred embodiment, such a change of electrical states can be used as a select signal for the optical viewfinder 120.

2-2. Flow of Changing What is Displayed on Monitor During Shooting

Next, it will be described with reference to FIG. 7 exactly in what procedure images and/or information on the monitor screen need to be changed when a shooting operation is performed with the digital camera 300 of this preferred embodiment.

FIG. 7 is a flowchart showing how the images and/or information on the monitor screen are changed as a shooting operation is performed with the digital camera 300.

First of all, when the user chooses a shooting mode in Step S700, the digital camera 300 starts to shoot the subject. Once a shooting mode has been chosen, the process advances to Step S701, in which the controller 110 determines whether the optical viewfinder 120 is attached to the camera 300 or not.

If the answer to the query of Step S701 is NO, the process advances to Step S702, in which the controller 110 performs the same processing on the LCD monitor 114 as in a situation where the controller 110 accepts the user's decision to use the LCD monitor 114 for shooting in Step S302 of the first preferred embodiment.

On the other hand, if the answer to the query of Step S701 is YES, then the process advances to Step S703, in which the controller 110 performs the same processing on the LCD monitor 114 as in a situation where the controller 110 accepts the user's decision to use the optical viewfinder 120 for shooting in Step S303 of the first preferred embodiment.

The digital camera of this preferred embodiment performs the rest of the control operation in quite the same way as the counterpart of the first preferred embodiment described above.

As described above, the digital camera of this preferred embodiment automatically senses the optical viewfinder 120 be attached to, or removed from, itself and selects the image or information to be presented or displayed on the LCD monitor 114 automatically again. As a result, when the optical viewfinder is attached to the digital camera, the user does not have to change setting in order to use the optical viewfinder properly.

Optionally, a sensor (not shown) may be provided for the optical viewfinder 120 to determine whether or not the user is viewing the subject through the viewfinder 120. If the sensor has sensed the user viewing the subject currently, then the controller 110 may change what is displayed on the LCD monitor 114 automatically on the supposition that the viewfinder is now selected. The sensor that can be provided for the optical viewfinder 120 may be an illuminance sensor, for example.

Although first and second preferred embodiments of the present invention have been described, the present invention is in no way limited to those specific preferred embodiments but may be readily modified in the following manner.

Specifically, the optical system and drive system of the digital camera to which the present invention is applied are not limited to the ones shown in FIG. 2. For example, in the preferred embodiment illustrated in FIG. 2, the optical system is supposed to consist of three groups 101, 102 and 103 of lenses. However, the optical system may also consist of any other groups of lenses. Also, although the zoom lens 102 forms part of the optical system in the example illustrated in FIG. 2, the optical system may also be a single-focus optical system with no zoom lenses. Furthermore, each of the lenses 101 to 103 may be either a single lens or a group of multiple lenses. If necessary, the zoom motor 104 and the focus motor 105 may be combined into a single motor.

Also, in the first and second preferred embodiments of the present invention described above, the imager is supposed to be the CDD image sensor 106. However, the present invention is in no way limited to those specific preferred embodiments. Alternatively, the imager may also be a CMOS image sensor or an NMOS image sensor.

The image processing section 108 and the controller 110 may be implemented as either a single semiconductor chip or two different semiconductor chips.

Furthermore, in the first and second preferred embodiments of the present invention described above, the monitor screen is supposed to be the LCD monitor 114. However, the present invention is in no way limited to those specific preferred embodiments. Rather the LCD monitor 114 may be replaced with an organic EL display or an inorganic EL display, for instance.

Furthermore, in the foregoing description of preferred embodiments, when the optical viewfinder 122 is used, information about the degree of focusing and/or information about the charging status of the flash 122 is/are supposed to be displayed on the LCD monitor 114. However, those are just bits of information about various statuses of the digital camera. As long as the information is concerned with various statuses of the digital camera, not just the degree-of-focusing information and/or the charging status information of the flash 122 but also at least one piece of information about the battery charge level, the number of additional pictures that can be stored and the focal length may be displayed as well. In any case, those pieces of information are preferably information about various statuses of the digital camera, and more particularly, bits of information that the user needs for shooting. Optionally, the device may also be designed so as to allow the user to pick his or her desired pieces of information to display through the menu.

In the preferred embodiments of the present invention described above, the optical viewfinder 120 is supposed to be readily attachable to, and removable from, the digital camera. However, the optical viewfinder 120 may also form an integral part of the digital camera as well.

According to the present invention, the power dissipation of the image capture device can be cut down compared to conventional ones. In addition, information about various statuses of the image capture device can be displayed to the user without providing any dedicated member for that purpose. Consequently, the present invention is effectively applicable for use in digital still cameras, digital camcorders, cellphones with a camera, and various other types of image capture devices.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2008-077321 filed on Mar. 25, 2008 and No. 2009-071728 filed on Mar. 24, 2009, the entire contents of which are hereby incorporated by reference.

What is claimed is:

1. An image capture device with a viewfinder for viewing a subject,
the viewfinder either forming an integral part of the device or being an external member that is attachable to, and removable from, the device, the device comprising:
an optical system;
a generating section for capturing an image of the subject through the optical system and generating image data;
a detecting section for detecting the degree of focusing of the subject's image represented by the image data;
a display section on which the subject's image is presentable based on the image data; and
a controller for accepting a decision to use either the display section or the viewfinder for viewing the subject to shoot,
wherein if the controller accepts the decision to use the viewfinder, the display section displays no subject's image, and displays information representing whether the subject's image is now in focus or not for at least a certain period of time, the information having been obtained based on a result of detection done by the detecting section.

2. The image capture device of claim 1, wherein if the controller accepts the decision to use the display section, the display section not only presents the subject's image based on the image data but also displays, for at least a certain period of time, information representing whether the subject's image is now in focus or not that has been obtained based on the result of detection done by the detecting section.

3. The image capture device of claim 1, further comprising:
a light-emitting section for emitting a flash of light toward the subject; and
a charging status detecting section for detecting the charging status of the light-emitting section,
wherein if the controller accepts the decision to use the viewfinder, the display section further displays information about the charging status based on the result of detection done by the charging status detecting section.

4. The image capture device of claim 1, wherein the optical system includes a zoom lens for zooming in on, or out of, the subject, the device further includes:
an operating section for accepting a zoom command that the subject be zoomed in on or out of; and
a drive section for driving the zoom lens in response to the zoom command,
wherein if the controller accepts the decision to use the viewfinder and if the operating section accepts the zoom command, then the display section presents the subject's image for at least a certain period of time based on the image data.

5. The image capture device of claim 4, wherein the display section presents the subject's image based on the image data while the operating section is accepting the zoom command and for a predetermined amount of time after the zoom command has been accepted.

6. The image capture device of claim 4, wherein the display section presents the subject's image based on the image data before the zoom lens is driven and after the zoom lens has been driven.

7. The image capture device of claim 4, wherein the display section presents the subject's image based on the image data unless the zoom lens is at wide end.

8. The image capture device of claim 1, further comprising an operating section for receiving a user's command to use either the display section or the viewfinder.

9. The image capture device of claim 8, wherein if the controller accepts the decision to use the display section in accordance with the user's command that has been relayed by way of the operating section, the display section not only presents the subject's image based on the image data but also displays information representing whether the subject's image is now in focus or not that has been obtained based on the result of detection done by the detecting section.

10. The image capture device of claim 8, further comprising:
a light-emitting section for emitting a flash of light toward the subject; and a charging status detecting section for detecting the charging status of the light-emitting section,
wherein if the controller accepts the user's decision to use the viewfinder in accordance with his or her command that has been relayed by way of the operating section, the display section further displays information about the charging status based on the result of detection done by the charging status detecting section.

11. The image capture device of claim 8, wherein the optical system includes a zoom lens for zooming in on, or out of, the subject, wherein the operating section further accepts a zoom command that the subject be zoomed in on or out of, and
wherein the device further includes a drive section for driving the zoom lens in response to the zoom command, and
wherein if the controller accepts the user's decision to use the viewfinder and if the operating section accepts the zoom command, then the display section presents the subject's image based on the image data.

12. The image capture device of claim 1, wherein if the viewfinder is an external member that is attachable to, and removable from, the device, the image capture device further comprises:
a holder section to hold the viewfinder attached; and
a viewfinder sensing section for determining whether or not the viewfinder has been attached to the device,
wherein if the viewfinder sensing section has sensed the viewfinder be attached to the device, the controller accepts the decision to use the viewfinder.

13. The image capture device of claim 1, wherein the viewfinder includes a sensor for determining whether or not a user is now viewing the subject through the viewfinder, and
wherein if the sensor has sensed the user viewing the subject through the viewfinder, the controller accepts the decision to use the viewfinder.

14. The image capture device of claim 1, wherein the display section continues to display the information representing whether the subject's image is now in focus or not for at least the certain period of time since the subject has been sensed to come into focus.

15. The image capture device of claim 1, wherein the display section continues to display the information representing whether the subject's image is now in focus or not for at least the certain period of time since the device has started focusing onto the subject.

16. An image capture device with a viewfinder for viewing a subject, the viewfinder either forming an integral part of the device or being an external member that is attachable to, and removable from, the device, the device comprising:
an optical system including a zoom lens for zooming in on, or out of, the subject;
an operating section for accepting a zoom command that the subject be zoomed in on or out of;
a drive section for driving the zoom lens in response to the zoom command:
a generating section for capturing an image of the subject through the optical system and generating image data;
a display section on which the subject's image is presentable based on the image data; and
a controller for accepting a decision to use either the display section or the viewfinder for viewing the subject to shoot,
wherein in a case where the controller accepts the decision to use the viewfinder and the display section displays no subject's image, when the operating section accepts a zoom command, the display section presents the subject's image for at least a certain period of time based on the image data unless the zoom lens is at wide end.

* * * * *